US006721138B1

(12) United States Patent
Chen et al.

(10) Patent No.: US 6,721,138 B1
(45) Date of Patent: Apr. 13, 2004

(54) INDUCTIVE TRANSDUCER WITH STITCHED POLE TIP AND PEDESTAL DEFINING ZERO THROAT HEIGHT

(75) Inventors: Yingjian Chen, Fremont, CA (US); Xizeng Shi, Fremont, CA (US); Hugh Craig Hiner, Fremont, CA (US); Zi-Wen Dong, Union City, CA (US); Francis Liu, Fremont, CA (US); Matthew R. Gibbons, Livermore, CA (US); Joyce Anne Thompson, Menlo Park, CA (US); William D. Jensen, Fremont, CA (US); Chester Xiaowen Chien, San Jose, CA (US); Yugang Wang, Milpitas, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 76 days.

(21) Appl. No.: 09/999,694

(22) Filed: Oct. 24, 2001

(51) Int. Cl.[7] ............................. G11B 5/39; G11B 5/31
(52) U.S. Cl. ......................... 360/317; 360/126
(58) Field of Search ................... 360/126, 317

(56) References Cited

U.S. PATENT DOCUMENTS

| | | | | |
|---|---|---|---|---|
| 5,282,308 A | | 2/1994 | Chen et al. ............ | 29/603 |
| 5,283,942 A | | 2/1994 | Chen et al. ............ | 29/603 |
| 5,285,340 A | | 2/1994 | Ju et al. .............. | 360/119 |
| 5,375,023 A | | 12/1994 | Ju et al. .............. | 360/119 |
| 5,872,693 A | * | 2/1999 | Yoda et al. ............ | 360/126 |
| 6,043,960 A | | 3/2000 | Chang et al. ........... | 360/126 |
| 6,054,023 A | | 4/2000 | Chang et al. ........... | 204/192.2 |
| 6,091,582 A | * | 7/2000 | Komuro et al. ......... | 360/126 |
| 6,111,724 A | | 8/2000 | Santini ................ | 360/126 |
| 6,158,107 A | | 12/2000 | Chang et al. ........... | 29/603.14 |
| 6,172,848 B1 | | 1/2001 | Santini ................ | 360/126 |
| 6,173,486 B1 | | 1/2001 | Hsiao et al. ........... | 29/603.14 |
| 6,178,065 B1 | | 1/2001 | Terunuma et al. ........ | 360/126 |
| 6,178,070 B1 | | 1/2001 | Hong et al. ............ | 360/317 |
| 6,181,514 B1 | | 1/2001 | Santini et al. ........ | 360/126 |
| 6,233,116 B1 | * | 5/2001 | Chen et al. ........... | 360/126 |
| 6,259,583 B1 | * | 7/2001 | Fontana et al. ........ | 360/126 |
| 6,275,360 B1 | * | 8/2001 | Nakamoto et al. ....... | 360/319 |
| 6,407,885 B1 | * | 6/2002 | Ahagon et al. ......... | 360/126 |
| 6,441,995 B1 | * | 8/2002 | Sasaki ................ | 360/126 |
| 6,462,915 B1 | * | 10/2002 | Sasaki ................ | 360/317 |
| 6,483,663 B2 | * | 11/2002 | Okada et al. .......... | 360/126 |
| 6,525,903 B1 | * | 2/2003 | Sasaki ................ | 360/126 |
| 6,538,845 B1 | * | 3/2003 | Watanabe et al. ....... | 360/126 |

OTHER PUBLICATIONS

IEEE Transactions on Magnetics article entitled "Side Track Erasure of Stitched–Pole Magnetic Recording Heads", by D. Guarisco et al., vol. 36, No. 5, Sep. 2000, pp. 2527–2529.
IEEE Transactions on Magnetics article entitled "Design of Recessed Yoke Heads for Minimizing Adjacent Track Encroachment", by Y. K. Kim et al., vol. 36, No. 5, Sep. 2000, pp. 2524–2526.

* cited by examiner

Primary Examiner—David Ometz
(74) Attorney, Agent, or Firm—Mark Lauer; Silicon Edge Law Group LLP

(57) ABSTRACT

An inductive transducer having first and second magnetic pedestals disposed between first and second magnetic pole layers and adjacent to a media-facing surface, the pedestals separated by a submicron, nonmagnetic gap. The first pedestal extends less than the second pedestal from the media-facing surface, defining a short throat height. The second pedestal extends further to provide sufficient area for stitching to the second pole layer. The stitching and the thickness provided by the pedestals allow plural coil layers to be disposed between the pole layers, and the second pedestal, as well as other features, can be defined by high-resolution photolithography. The two coil layers have lower resistance, lower inductance and allow the pole layers to be shorter, improving performance. All or part of either or both of the pedestals may be formed of high magnetic saturation material, further enhancing performance.

18 Claims, 4 Drawing Sheets

INDUCTIVE TRANSDUCER WITH STITCHED POLE TIP AND PEDESTAL DEFINING ZERO THROAT HEIGHT

BACKGROUND OF THE INVENTION

The present invention relates to inductive electromagnetic transducers, which may for example be employed in information storage systems or measurement and testing systems.

An inductive head used for writing and/or reading magnetic information on a storage media such as a disk or tape includes electrically conductive coil windings encircled by a magnetic core including first and second pole layers. Portions of the pole layers adjacent the media are termed pole tips. The magnetic core is interrupted by a submicron nonmagnetic gap disposed between the pole tips to divert magnetic flux to the media during writing. To write to the media electric current is flowed through the coil, which produces magnetic flux in the core encircling the coil windings, the magnetic flux fringing across the nonmagnetic gap adjacent to the media so as to write bits of magnetic field information in tracks on the media.

The first pole layer may also serve as a magnetic shield layer for a magnetoresistive (MR) sensor that has been formed prior to the pole layers, the combined MR and inductive transducers termed a merged or piggyback head. Typically the first pole layer is substantially flat and the second pole layer is curved, as a part of the second pole layer is formed over the coil windings and insulation disposed between the pole layers, while another part nearly adjoins the first pole layer adjacent the gap. The second pole layer may also diverge from a flat plane by curving to meet the first pole layer in a region distal to the media-facing surface, sometimes termed the back gap region, although typically a nonmagnetic gap in the core does not exist at this location.

The curvature of the second pole layer from planar affects the performance of the head. An important parameter of the head is the throat height, which is the distance from the media-facing surface to where the first and second pole layers begin to diverge and be separated by more than the submicron nonmagnetic gap. Because less magnetic flux crosses the gap as the pole layers are further separated, a short throat height is desirable in obtaining a fringing field for writing to the media that is a significant fraction of the total flux crossing the gap.

In addition to the second pole layer being curved from planar, one or both pole layers may also have a tapered width in the pole tip area, to funnel flux through the pole tips. A place where the second pole layer begins to widen is sometimes termed a nose or flare point. The distance to the flare point from the media-facing surface, sometimes called the nose length, also affects the magnitude of the magnetic field produced to write information on the recording medium, due to decay of the magnetic flux as it travels down the length of the narrow second pole tip. Thus, shortening the distance of the flare point from the media-facing surface would also increase the flux reaching the recording media.

Unfortunately, the aforementioned design parameters require a tradeoff in the fabrication of the second pole tip. The second pole tip should be narrow and well-defined in order to produce narrow and well-defined written tracks on the rotating disk, but the slope of the second pole layer at the end of the throat height makes photolithography difficult. The second pole layer can be formed in two pieces to better define the pole tip; a flat pole tip layer and a curved yoke layer that are connected or stitched together. This solution, however, can actually require the throat height to be extended in order to have a sufficient stitched area for flux transfer between the second pole tip and the yoke. High-resolution photolithography, such as I-line or deep ultra violet (DUV) photolithography, may be useful for reducing feature sizes but has a more limited depth of focus that may exacerbate the problem of focusing on the sloped pole layer adjacent the throat.

In addition, several methods are known to form self-aligned pole tips. In one method, an ion beam etch (IBE) or other highly anisotropic process removes a portion of the second pole layer not protected by a mask, thereby creating the second pole tip, with the etching continued to similarly remove a portion of the first pole tip not covered by the second pole tip. The width of the pole tip layers are therefore matched, and walls of the pole tips are aligned, but the problem of accurately defining the second pole tip by photolithography for a short throat height remains. Other proposals include forming an electrically conductive gap layer, so that the second pole tip can be electroplated atop the first. A second pole tip directly plated on a conductive gap layer may have magnetic disadvantages and other difficulties, however, and so has not been widely employed.

SUMMARY

In accordance with the present invention, an inductive transducer is disclosed having first and second magnetic pedestals disposed between first and second magnetic pole layers adjacent to a media-facing surface, the pedestals separated by a submicron, nonmagnetic gap. The first pedestal extends less than the second pedestal from the media-facing surface and defines a short throat height. The second pedestal extends further to provide sufficient area for stitching to the second pole layer. The second pedestal is formed on a flat surface, allowing a high performance magnetic layer defined by high-resolution photolithography to adjoin the trailing edge of the gap.

The stitching and the thickness provided by the pedestals allow plural coil layers to be disposed between the pole layers, reducing the coil circumference compared to a conventional single layer coil having equivalent electromotive force. The plural coil layers have less resistance and inductance than the conventional single layer coil, and allow the pole layers to be shorter, all of which improve performance. All or part of either or both of the pedestals can also be formed of high magnetic saturation material, further enhancing performance.

DETAILED DESCRIPTION OF THE PREFERRED EMBODIMENTS

Figure 1:
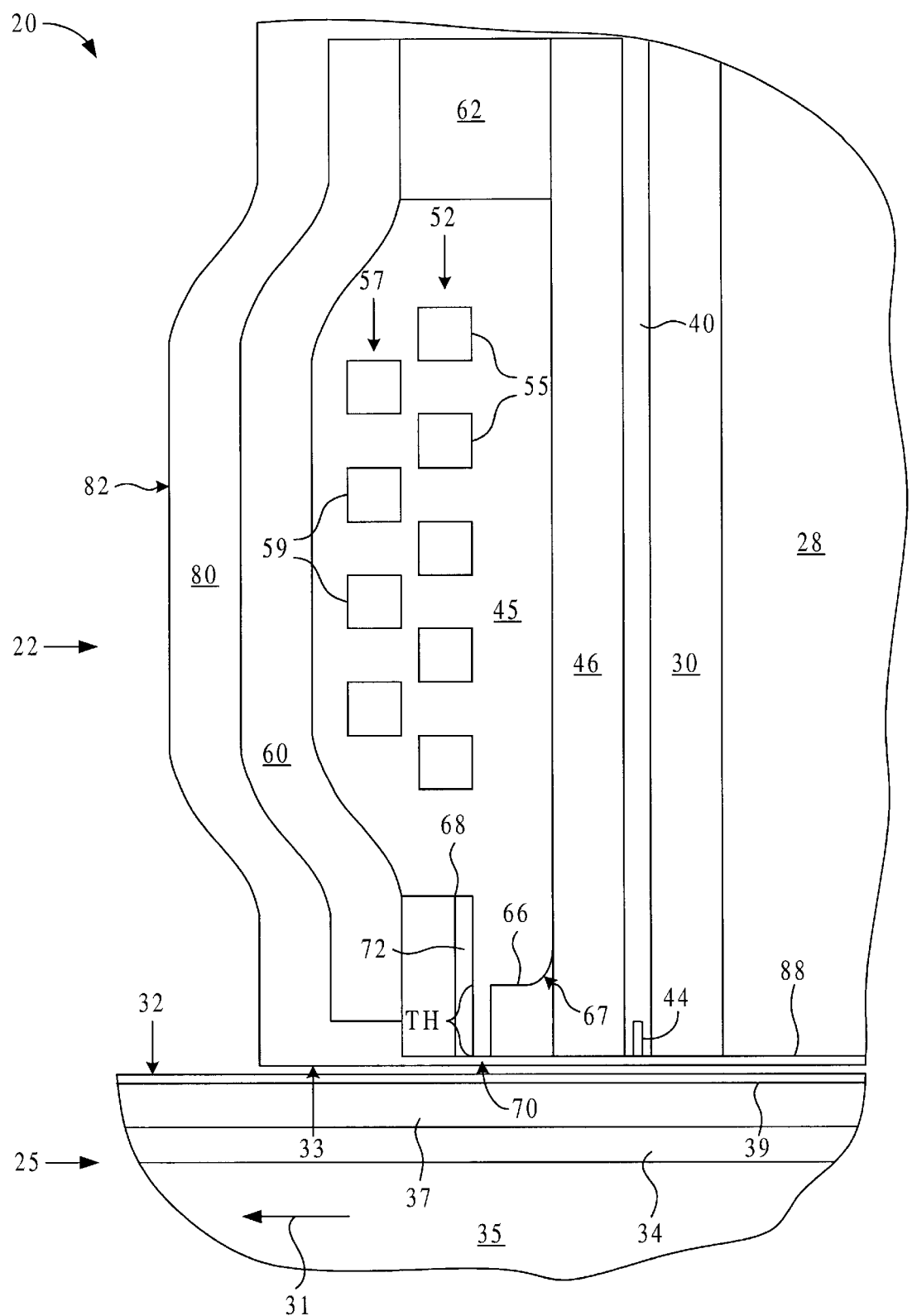
FIG. 1 is a cutaway cross-sectional view of a portion of an information storage system in accordance with one embodiment of the present invention.

FIG. 1 depicts a cutaway cross-section of a portion of an information storage system 20 in accordance with an embodiment of the present invention. A portion of an electromagnetic head including a merged inductive and MR transducer 22 is depicted in close proximity to a relatively moving media such as a spinning disk 25. The transducer 22 is formed in a plurality of adjoining solid layers on a wafer substrate 28 that may remain affixed to the transducer 22. A media-facing surface 33 of the solid body that includes the transducer 22 may be formed with a desired relief for fluid and solid interaction with the disk 25, and the body may be termed a head or slider.

The disk 25 may be conventional and includes a self-supporting substrate 35, an underlayer 34, a media layer 37 and a protective overcoat 39. The disk 25 is spinning in a direction indicated by arrow 31 and has a surface 32 adjacent the media-facing surface 33 of the head.

Atop the slider substrate 28 a first low-coercivity, high-permeability or "soft magnetic" shield layer 30 has been formed, for example of Permalloy ($Ni_{0.8}Fe_{0.2}$) either directly or atop a seed layer, not shown. A first layer of nonmagnetic, electrically insulating material has been formed on the shield layer, followed by a magnetoresistive (MR) sensor 44. The MR sensor can be any sensor that utilizes a change in resistance associated with a change in magnetic field to sense that field, which may be measured as a change in current or voltage across the sensor, including anisotropic magnetoresistive (AMR) sensors, spin-valve (SV) sensors, spin-dependent tunneling (SDT) sensors, giant magnetoresistive (GMR) sensors and colossal magnetoresistive (CMR) sensors.

A second layer of nonmagnetic, electrically insulating material has been formed between the MR sensor and a second soft magnetic shield layer, which also serves as a first pole layer 46 in this example of a merged head. The first and second layers of nonmagnetic, electrically insulating material are indicated together as region 40. The MR sensor 44 may be electrically connected to the shield layers 30 and 46 in some embodiments, such as spin-dependent tunneling sensors.

A first electrically conductive coil layer 52 has first coil sections 55 that are separated from the first pole layer 46 by additional nonmagnetic, electrically insulating material 45. A second electrically conductive coil layer 57 has second coil sections 59 that are separated from the first coil sections 55 by material 45, but may be connected to first coil layer 52 in an interconnect not shown in this cross-section. For example, first coil layer 52 may spiral in a clockwise direction and second coil layer 57 may spiral in a counter-clockwise direction with the center sections of the coils interconnected, so that current in coil sections 55 is parallel to current in coil sections 59. Second coil sections 59 are isolated from a second soft magnetic pole layer 60, the second pole layer coupled to the first pole layer 46 by a soft magnetic stud 62. Additional coil layers may also be formed. A protective coating 80 is formed on a trailing edge 82 of the body, while another protective coating 88 is formed on the media-facing surface 33.

Having two coil layers 52 and 57 as opposed to a single coil layer that is typical is advantageous for several reasons. First, the two coil layers have less resistance than a single coil layer. This is because the overall length of the coil is less for the case of two coil layers, as the circumference of the coil is reduced despite having the same number of coil sections encircled by the magnetic core. The shorter coil length reduces the resistive heat produced by the coil, reducing the possibility of protrusion of a pole tip that can occur due to expansion of material 45, which typically includes baked photoresist. Since current commercially available disk drive heads "fly" at a separation of less than a microinch (about 25 nanometers) from a rigid disk that may be spinning at 10,000 revolutions per minute, even a small protrusion due to the resistive heating of those heads could cause a crash, and avoiding a crash may require increasing the separation of the sensor from the disk, decreasing the resolution. Second, the inductance of the two coil layers is reduced compared to that of a typical single coil layer. Inductance of a coil is a function of the area surrounded by the coil, and so the smaller circumference afforded by two coil layers reduces the inductance of that coil, despite having the same number of coil sections encircled by the magnetic core. Lower inductance allows higher frequency operation. Third, the inductance of the core is reduced due to the shorter pole layers afforded by the two coil layers. This also allows for higher frequency operation, which is important for higher storage density, higher recording rates and faster access times.

A first soft magnetic pedestal 66 is disposed adjacent the media-facing surface 33 and the first pole layer 46. The first pedestal 66 may be made of high moment or saturation material (high Bs) to avoid saturation of the pedestal 66 during writing. High Bs materials currently have a saturation moment of at least 18 kG. For example, the first pedestal 66 may be made of sputtered, laminated high $B_S$ material, such as laminated CoFeN having a moment $B_S$ of about 24 kG. Alternative high $B_S$ materials include FeXN, where X is an element selected from a group including Rh, Al, Ta, Zr and Ti, having a $B_S$ of about 20 kG–22 kG. Other high $B_S$ materials known or developed may alternatively be employed in first pedestal 66. For the case in which first pedestal 66 is laminated, plural layers of high $B_S$ material may be interspersed with at least one layer of lower $B_S$ material or nonmagnetic material that is either electrically conductive or not electrically conductive. The first pedestal 66 may have a tapered base 67 that provides for increased flux transfer between pedestal 66 and pole layer 46.

A second soft magnetic pedestal 68 is disposed adjacent the media-facing surface 33 and the second pole layer 60, the second pedestal 68 separated from the first pedestal 66 by a submicron nonmagnetic gap 70. A throat height TH is defined by the first pedestal 66, allowing the throat height TH to be made small for high performance. The height TH may be less than a micron, for example. The second pedestal 68 extends further than the first pedestal 66 from the media-facing surface 33, allowing the second pole layer 60 to overlap the second pedestal 68 in a relatively large area for transfer of flux between the pedestal 68 and pole layer 60. Second pole layer 60 terminates further from the media-facing surface 33 than does second pedestal 68, to reduce the possibility of writing to the media layer 37 with the second pole layer 60 instead of or in addition to the second pedestal 68. All of or a layer 72 of the second pedestal 68 adjacent the gap 70 may be made of high $B_S$ material to avoid saturation of the pedestal 68 during writing. Second pedestal 68 may also be made of plural layers of high $B_S$ material with at least one interspersed layer of lower $B_S$ material or nonmagnetic material that is either electrically conductive or not electrically conductive.

Figure 2:
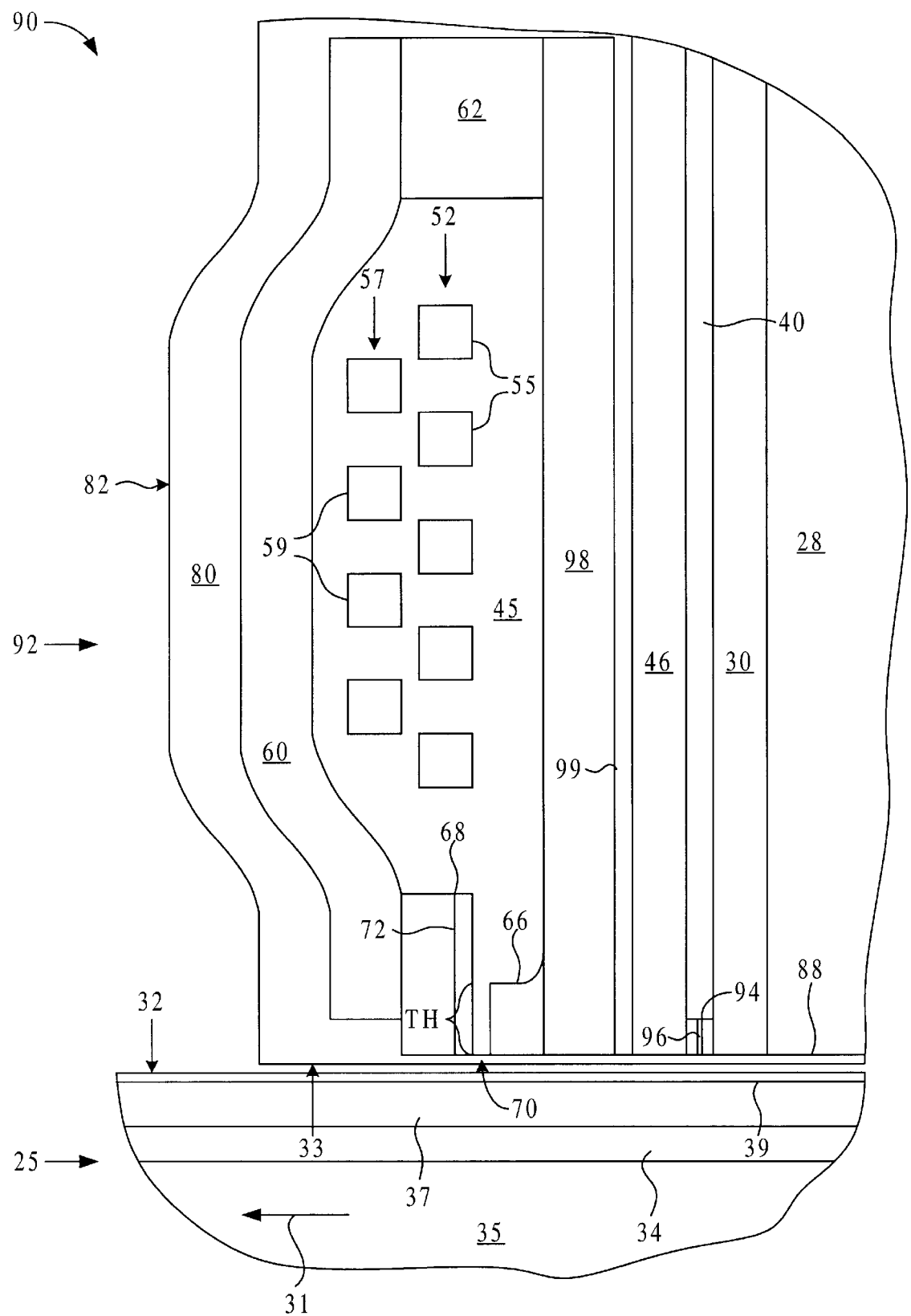
FIG. 2 is a cutaway cross-sectional view of a portion of an information storage system in accordance with another embodiment of the present invention.

FIG. 2 depicts a cutaway cross-section of a portion of an information storage system 90 similar to that depicted in FIG. 1, but having a piggyback transducer including a spin-dependent tunneling sensor 94 with an electrically insulating tunnel barrier 96. A first pole layer 98 is separated from second shield layer 46 in this piggyback embodiment by an electrically insulating layer 99. Shields 30 and 46 can serve as or be connected to a conductive lead for the sensor 94. Although FIG. 2 depicts a SDT sensor in a piggyback head and FIG. 1 depicts a SV sensor in a merged head, the converse combinations are also possible, as well as other head/sensor combinations. For example, a magnetic field sensor can be disposed closer than the inductive transducer to the trailing end.

Figure 3:
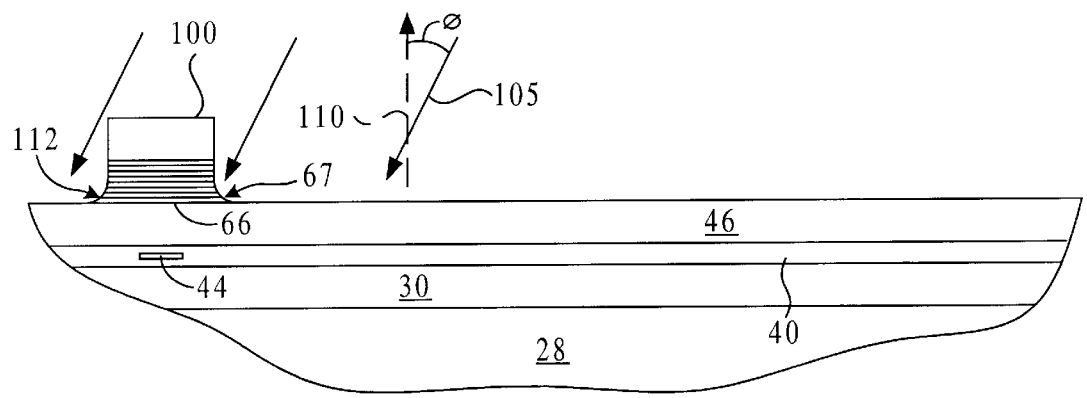
FIG. 3 is a cutaway cross-sectional view of a step in the fabrication of a transducer for the information storage system of FIG. 1.

FIG. 3 shows some initial steps in forming the transducer 22 of FIG. 1. The transducer 22 is formed along with thousands of similar transducers, not shown, on the wafer substrate 28, which may be made of AlTiC, Alumina, SiC or other known materials. Atop the wafer substrate 28 the first soft magnetic shield layer 30 is formed, for example by window frame plating, either directly on the substrate or atop a seed layer, not shown. An alumina or other dielectric layer, not shown, is then deposited and lapped to form a coplanar surface with the first shield layer 30.

A first submicron read gap layer of nonmagnetic, electrically insulating material is formed on the shield layer, followed by MR sensor 44. Although shown as a single element in this figure, the MR sensor may be composed of plural layers, and electrical leads for the MR sensor 44 may extend between the shields 30 and 46 toward and away from the viewer, as known in the art. A second submicron read gap layer of nonmagnetic, electrically insulating material is then formed between the MR sensor 44 and the shield/pole layer 46. The first and second layers of nonmagnetic, electrically insulating material, as well as additional layers of such material, are indicated together as region 40.

After lapping the shield/pole layer 46 and a dielectric layer that forms a flat surface with the shield/pole layer 46, the first pedestal 66 is formed on the shield/pole layer 46. In this example, first pedestal 66 is formed of a plurality of layers of sputtered, high $B_S$ material, such as CoFeN or FeXN, where X is an element selected from a group including Rh, Al, Ta, Zr and Ti, interspersed with at least one layer of magnetic material such as Permalloy, conductive nonmagnetic material such as Cr or Ti, or dielectric material such as alumina or AlN. The layers forming first pedestal can each have a thickness in a range between a single atomic layer and a micron. A mask 100 is defined over the layers of material and the pedestal is then defined by an angled, rotating or sweeping IBE 105 or other anisotropic removal at an angle Ø to perpendicular 110 that may vary, the IBE producing tapered edges such as edge 67 and edge 112.

Alternatively, first pedestal 66 can be formed of a single layer of sputtered, high $B_S$ material, or can be formed of a sputtered layer, for example of Permalloy, upon which a high $B_S$ material, for example $Ni_{0.45}Fe_{0.55}$ is electroplated. In the latter case, the pedestal may be electroplated though an opening in a negative photoresist layer to form a tapered base, with a magnetic stud layer electroplated in another photoresist opening in the back gap region, after which the photoresist is chemically removed. In yet another embodiment, first pedestal 66 can be formed of seeding and plating material such as permalloy, after which a layer of high $B_S$ material can be formed by sputtering or other vacuum techniques.

Figure 4:
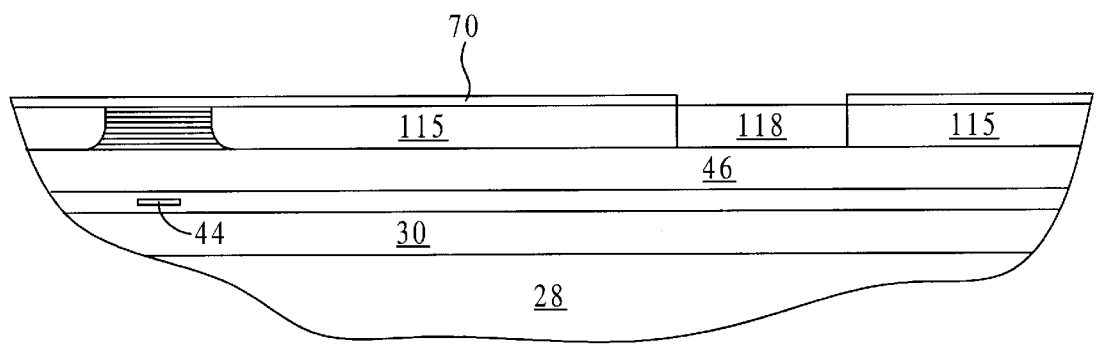
FIG. 4 is a cutaway cross-sectional view of another step in the fabrication of the transducer subsequent to that shown in FIG. 3.

In FIG. 4 a dielectric filler layer 115 has been formed over and around the first pedestal 66 and then polished flat, by lapping or chemical-mechanical polishing (CMP). The write gap layer 70 is then deposited, for example of alumina or other non-ferromagnetic material sputtered to a thickness in a range between about 50 nanometers and 250 nanometers. A mask is formed over the gap layer 70 that leaves an aperture for forming a magnetic stud, and a removal step such as reactive ion etching (RIE) or IBE is performed that exposes shield/pole layer 46. A first soft magnetic stud layer 118 is then formed by electroplating. Alternatively, for the case in which the stud 118 has been earlier electroplated, the stud layer 118 can be polished by CMP along with the pedestal and dielectric layer 115. A mask can then be defined over the stud 118, the mask being lifted off after deposit of the gap layer 70 to expose the stud layer 118.

Figure 5:
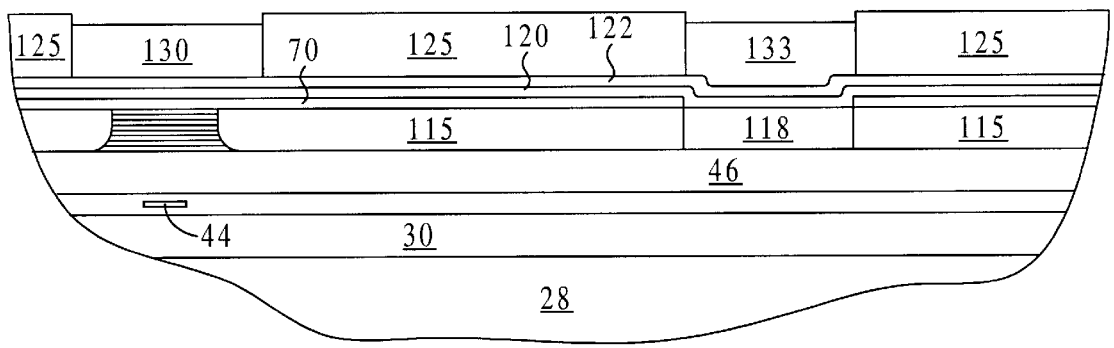
FIG. 5 is a cutaway cross-sectional view of another step in the fabrication of the transducer subsequent to that shown in FIG. 4.

FIG. 5 shows that a layer 120 of high $B_S$ material has been sputtered or otherwise deposited on the gap layer 70 and exposed stud layer 118 for creating a sharp magnetic pattern at an unsaturated edge of the second pedestal that adjoins the gap 70. High $B_S$ material having a favorable crystalline structure can be formed on the flat write gap surface, whereas formation of such material on a conventional curving yoke is problematic. An optional seed layer 122 may then formed of NiFe or CoNiFe over the high $B_S$ layer 120 for the case in which it is beneficial for subsequent electroplating. A photoresist mask 125 is then defined that leaves openings for electroplating a pedestal layer 130 and second stud layer 133, for example of NiFe. The mask 125 can be defined by high-resolution photolithography such as UV or deep UV with or without a tri-level image transfer technique. Alternatively, the second pedestal can be formed of a plurality of sputtered high $B_S$ layers with other layers formed therebetween, as a single sputtered layer of high $B_S$ material, or as a sputtered layer of high $B_S$ material upon which another layer high of $B_S$ material is electroplated.

Figure 6:
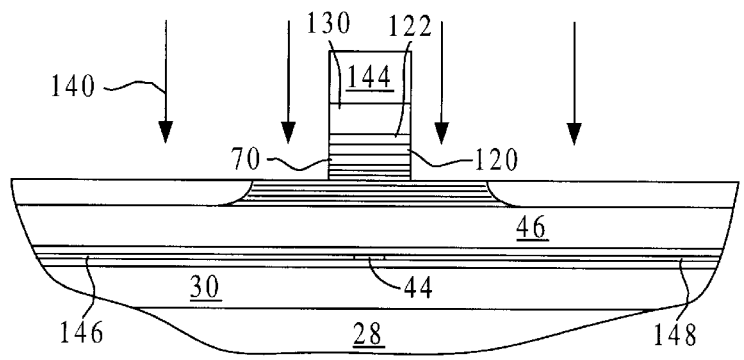
FIG. 6 is a cutaway cross-sectional view of another step in the fabrication of the transducer subsequent to that shown in FIG. 5, the cross-section of FIG. 6 being perpendicular to that of FIG. 5.

FIG. 6 shows a cross-section that is perpendicular to that of FIG. 5, FIG. 6 viewed from a direction where the media will be located during later operation. An IBE, RIE, reactive ion beam etching (RIBE) or other highly directional removal process is performed, represented by arrows 140, to remove the high $B_S$ layer 120 and optional seed layer 122 not covered by electroplated layer 130. This etching may also be used to trim edges of the first pedestal to match those of the second pedestal layers 120, 122 and 130. Alternatively, a mask 144 may be formed on electroplated layer 130, so that the first pedestal can be defined by directional etching about the mask 144, again represented by arrows 140, and a track width of the first pedestal matches that of the second pedestal. Also shown in the cross-sectional view of FIG. 6 are electrical leads 146 and 148 that provide electrical connections to MR sensor 44.

Figure 7:
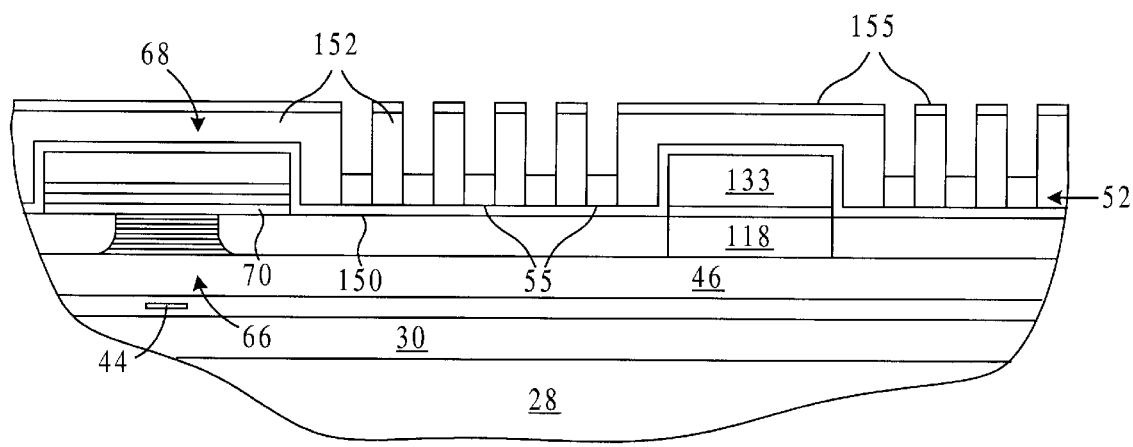
FIG. 7 is a cutaway cross-sectional view of another step in the fabrication of the transducer subsequent to that shown in FIG. 6, the cross-section of FIG. 7 being perpendicular to that of FIG. 6 and parallel to that of FIG. 5.

FIG. 7 shows a cross-section of the partially formed transducer that is perpendicular to that of FIG. 6 and parallel to that of FIG. 5. In FIG. 7, subsequent to the trimming depicted in FIG. 6, a conductive seed layer 150 of Cu, Au, Ag or the like has been sputter-deposited, after which a photoresist 152 has been deposited and spun to form a flat surface. The photoresist 152 can then be patterned into a mask having a spiral opening, and the coil layer 52 electroplated through the opening. Alternatively, a hard mask 155 made of $SiO_2$, for example, has been patterned by another photoresist and etched in a spiral pattern, for example by RIE with $CHF_3$, to expose the photoresist 152, which is then etched, for example by RIE with $O_2$, to expose the seed layer 150. Coil layer 52 is then electroplated with similar materials as seed layer 150, to form coil sections 55. An interconnect that will provide electrical connection between the coil layers is then electroplated, while the other coil sections are covered with photoresist. The photoresist 152 is then chemically removed and then the portions of seed layer 150 that are not covered by the electroplated coil layer are removed, for example by IBE or wet etching, separating coil sections 55.

Figure 8:
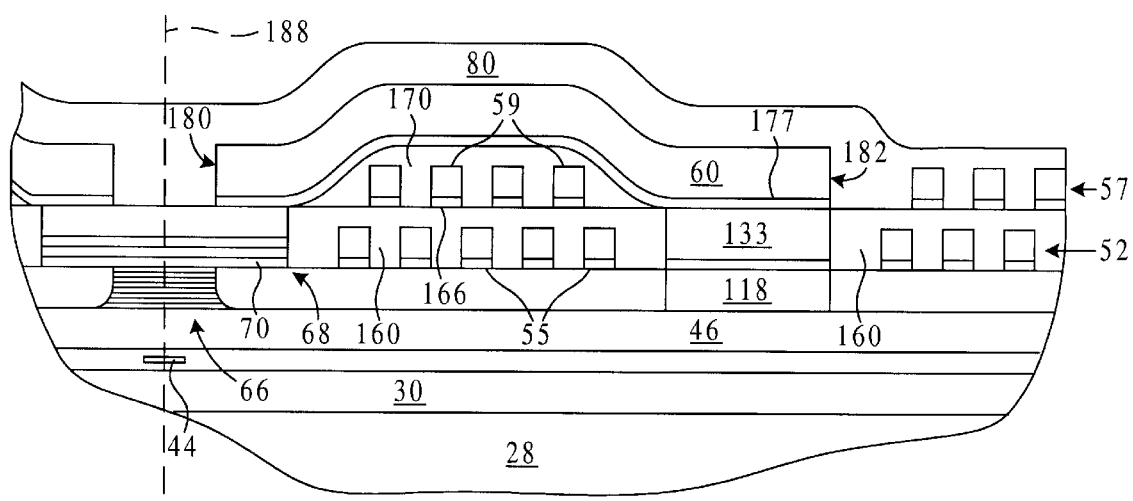
FIG. 8 is a cutaway cross-sectional view of another step in the fabrication of the transducer subsequent to that shown in FIG. 7.

In FIG. 8, a dielectric filler material 160, such as alumina, baked photoresist or a combination of such materials, has been formed on and around the second pedestal 68, coil sections 55 and magnetic stud layer 133. For example, a minimal amount of cured photoresist may be used to fill the space between coil sections 55, then covered by alumina that provides additional electrical insulation. The use of alumina instead of conventional baked photoresist as a filler material is advantageous in that alumina has a lower thermal expansion coefficient, reducing problems such as pole tip protrusion. The filler material 160 has been flattened by CMP to expose second pedestal 68, stud layer 133 and the electrical interconnect. A conductive seed layer 166 has been deposited and then covered with a photoresist, which has been formed into a mask exposing the seed layer 166 in a spiral pattern through which the second coil layer has been electroplated. After removal of the photoresist mask and milling of the seed layer 166 that is not covered by the coil sections 59, another layer of photoresist is patterned and cured about coil sections 59 to create sloping edges for the second pole layer 60.

A magnetic seed layer 177 has been deposited, and another photoresist then applied and patterned so that electroplating of second pole layer 60 leaves an edge 180 that will be removed from the media-facing surface, and another edge 182 at the back gap region. The photoresist has been removed, and portions of the seed layer 177 that are not covered by second pole layer 60 have been milled away. Protective coating 80, which may for example be sputtered of alumina, has been formed, after which the wafer will be diced into rows of transducers, for example along line 188, which will be polished and prepared into the media-facing surface.

Although we have focused on teaching the preferred embodiments of an improved electromagnetic transducer, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. An electromagnetic transducer comprising:
   a solid body having a leading end, a trailing end, and a media-facing surface;
   first and second soft magnetic pole layers magnetically coupled to each other, said second pole layer disposed closer than said first pole layer to said trailing end;
   an electrically conductive coil disposed in said body and including a plurality of adjacent coil sections oriented substantially parallel to each other, said coil sections disposed between and electrically isolated from said first and second pole layers;
   a first soft magnetic pedestal disposed adjacent to said first pole layer and said media-facing surface, said first pedestal extending much less than said first pole layer from said media-facing surface, said first pedestal having a base that is tapered to meet said first pole layer at a location that is further from said media-facing surface than a remainder of said first pedestal; and
   a second soft magnetic pedestal disposed adjacent to said second pole layer and said media-facing surface, said second pedestal extending less than said second pole layer from said media-facing surface, said second pedestal separated from said first pedestal by a submicron nonmagnetic gap, said second pedestal extending further than said first pedestal from said media-facing surface in a region adjacent to said gap.

2. The transducer of claim 1, wherein said second pedestal is disposed closer than said second pole layer to said media-facing surface.

3. The transducer of claim 2, wherein a distance along which said first pedestal adjoins said gap determines a throat height, and said second pole layer is disposed closer than said throat height to said media-facing surface.

4. The transducer of claim 1, wherein said second pedestal includes a high magnetic saturation material adjoining said gap.

5. The transducer of claim 1, wherein said first pedestal includes a high magnetic saturation material adjoining said gap.

6. The transducer of claim 1, wherein said electrically conductive coil includes a plurality of coil layers.

7. The transducer of claim 1, further comprising a magnetic field sensor disposed adjacent to said first pole layer or adjacent to said second pole layer.

8. The transducer of claim 1, wherein at least one of said pedestals has a plurality of layers containing high $B_S$ material, said high $B_S$ layers separated by a layer that does not contain high $B_S$ material.

9. An electromagnetic transducer comprising:
   a solid body having a leading end, a trailing end, and a media-facing surface;
   first and second soft magnetic pole layers magnetically coupled to each other, said first pole layer extending in a direction substantially perpendicular to said media-facing surface, said second pole layer disposed closer than said first pole layer to said trailing end;
   an electrically conductive coil disposed in said body and including a plurality of adjacent coil sections oriented substantially parallel to each other, said coil sections disposed between and electrically isolated from said first and second pole layers;
   a first magnetic pedestal disposed adjacent to said media-facing surface, between said first and second pole layers and adjoining a submicron nonmagnetic gap, said first pedestal extending less than said second pole layer from said media-facing surface to meet said gap at a throat height, wherein said first pedestal has a base that is tapered to meet said first pole layer at a location that is further from said media-facing surface than a remainder of said first pedestal;
   a second magnetic pedestal disposed between said first pedestal and said second pole layer and separated from said first pedestal by said nonmagnetic gap, said second pedestal extending further than said first pedestal from said media-facing surface in a region adjacent to said gap;
   said second pedestal being disposed at a first distance from said media-facing surface;
   said second pole layer being disposed at a second distance from said media-facing surface; and said second distance being greater than said first distance and less than said throat height.

10. The transducer of claim 9, wherein said second pedestal includes a high magnetic saturation material adjoining said gap.

11. The transducer of claim 9, wherein at least one of said pedestals has a plurality of layers containing high $B_S$ material, said high $B_S$ layers separated by a layer that does not contain high $B_S$ material.

12. The transducer of claim 9, wherein said first pedestal includes a high magnetic saturation material adjoining said gap.

13. The transducer of claim 9, wherein said electrically conductive coil includes a plurality of coil layers.

14. An electromagnetic transducer comprising:

a solid body having a leading end, a trailing end, and a media-facing surface;

first and second soft magnetic pole layers magnetically coupled to each other, said second pole layer disposed closer than said first pole layer to said trailing end;

an electrically conductive coil disposed in said body and including a plurality of adjacent coil layers each having a plurality of coil sections disposed between and electrically isolated from said first and second pole layers, said coil sections oriented substantially parallel to each other;

a first soft magnetic pedestal disposed adjacent said first pole layer and said media-facing surface, said first pedestal extending much less than said first pole layer from said media-facing surface, said first pedestal having a base that is tapered to meet said first pole layer at a location that is further from said media-facing surface than a remainder of said first pedestal; and a second soft magnetic pedestal disposed adjacent said second pole layer and said media-facing surface, said second pedestal extending less than said second pole layer from said media-facing surface, said second pedestal separated from said first pedestal by a submicron nonmagnetic gap, said second pedestal extending further than said first pedestal from said media-facing surface in a region adjacent to said gap.

15. The transducer of claim 14, wherein a distance along which said first pedestal adjoins said gap determines a throat height, said second pedestal is disposed closer than said second pole layer to said media-facing surface, and said second pole layer is disposed closer than said throat height to said media-facing surface.

16. The transducer of claim 15, wherein said second pedestal includes a high magnetic saturation material adjoining said gap.

17. The transducer of claim 15, wherein said first pedestal includes a high magnetic saturation material adjoining said gap.

18. The transducer of claim 15, wherein at least one of said pedestals has a plurality of layers containing high $B_S$ material, said high $B_S$ layers separated by a layer that does not contain high $B_S$ material.

* * * * *